United States Patent [19]

Patella

[11] 4,151,146

[45] Apr. 24, 1979

[54] PROCESS FOR PREPARING MULTIFUNCTIONAL ACRYLATE-MODIFIED VINYL ESTER-ALKYL ACRYLATE/METHACRYLATE COPOLYMER COAGULUM-FREE LATEX

[75] Inventor: Ralph F. Patella, South Plainfield, N.J.

[73] Assignee: Celanese Corporation, New York, N.Y.

[21] Appl. No.: 856,363

[22] Filed: Dec. 1, 1977

[51] Int. Cl.$^2$ .................... C08F 218/04; C08F 218/08
[52] U.S. Cl. ................................ 260/29.6 T; 526/224; 526/317; 526/320; 526/323.2
[58] Field of Search ............ 526/224, 317, 320, 329.5, 526/323.2, 323.1, 330; 260/29.6 T

[56] References Cited

U.S. PATENT DOCUMENTS

| | | | |
|---|---|---|---|
| 3,714,096 | 1/1973 | Biale | 526/330 |
| 3,767,600 | 10/1973 | Albright | 526/320 |
| 3,896,070 | 7/1975 | Tümmler et al. | 526/224 |
| 3,896,072 | 7/1975 | Tümmler et al. | 526/224 |
| 4,056,503 | 11/1977 | Powanda et al. | 526/320 |

*Primary Examiner*—Harry Wong, Jr.
*Attorney, Agent, or Firm*—Linn I. Grim

[57] ABSTRACT

A process for preparing multifunctional acrylate modified-vinyl ester-alkyl acrylate/methacrylate copolymer coagulum-free latex is disclosed which comprises emulsion-polymerizing a non-pre-emulsified mixture of:

(i) from about 40% to about 95% based on total weight of comonomers of a vinyl ester, (ii) from about 5% to about 35% based on total weight of comonomers of an ester derived from the reaction of a monohydric alcohol and acrylic acid or methacrylic acid, and (iii) from about 0.5% to about 10.0% based on total weight of comonomers of an ester derived from the reaction of a polyhydric alcohol and an acid selected from the group consisting of acrylic acid and methacrylic acid, there being at least two hydroxyl groups of the alcohol esterified with the acid, in the presence of a free radical polymerization catalyst and a chain transfer agent.

16 Claims, No Drawings

PROCESS FOR PREPARING MULTIFUNCTIONAL ACRYLATE-MODIFIED VINYL ESTER-ALKYL ACRYLATE/METHACRYLATE COPOLYMER COAGULUM-FREE LATEX

BACKGROUND OF THE INVENTION

1. Field of the Invention

This invention relates to the field of processes for polymerizing vinyl ester-alkyl acrylate/methacrylate comonomers.

2. Description of the Prior Art

Vinyl-acrylic copolymers are commonly prepared by way of emulsion polymerization techniques. A typical procedure involves admixing under rapid stirring the comonomer charge with water, surfactants or emulsifying agent, a polymerization catalyst or initiator, and, in most cases, a protective colloid-forming substance. The mixture is then heated to polymerization temperature for the time required to substantially complete the emulsion polymer formation. Many variations of the general preparative procedure are used to obtain, for example, lower viscosity, high solids content, improved freeze-thaw stability, etc. These variations include, for example, the use of a pre-emulsion technique (see U.S. Pat. No. 3,637,563) in which the monomer charge is first emulsified in water using a surfactant or emulsifying agent, and then the pre-emulsion is added to the reaction mixture which contains the remaining reactants; intermediate addition of surfactant to the polymerization reaction mixture during the polymerization (see U.S. Pat. No. 3,423,352); and addition of a water-soluble free radical initiator to a substantially completely polymerized emulsion and reacting further to reduce the viscosity of the emulsion (see U.S. Pat. No. 3,423,353).

According to commonly assigned U.S. Pat. No. 4,056,503 issued Nov. 1, 1977, a comonomer charge of vinyl acetate and an alkyl acrylate, including a multifunctional acrylate, is added to an aqueous surfactant-containing solution to provide a pre-emulsion which is then added to a polymerization reaction medium containing a redox catalyst and pre-heated to reaction temperature. This and similar pre-emulsion processes require special equipment and constant monitoring if substantially grit-free polymerizates are to be obtained. Accordingly, a thermally initiated emulsion polymerization procedure which does not require the preparation of a pre-emulsion would be technically and economically attractive if the resulting latex copolymer were free of coagulum and otherwise met the standards of the conventionally produced product. Actual attempts to carry out such a procedure employing a comonomer charge containing a multifunctional acrylate were unsuccessful, possibly because of the high rate of reactivity of the multifunctional comonomer. In the course of polymerization, coagulum formation developed at a fairly early stage and coatings of the unpigmented lattices were gritty and opaque.

SUMMARY OF THE INVENTION

It has surprisingly been discovered that the addition of a chain transfer agent to a comonomer charge containing a vinyl ester, an acrylic or methacrylic acid ester and a multifunctional acrylate provides a highly stable, substantially coagulum-free copolymer latex.

Broadly stated, the process of this invention comprises emulsion-polymerizing a non-pre-emulsified mixture of:

(i) from about 40% to about 95% based on total weight of comonomers of a vinyl ester, (ii) from about 5% to about 35% based on total weight of comonomers of an ester derived from the reaction of a monohydric alcohol and acrylic acid or methacrylic acid, and (iii) from about 0.5% to about 10.0% based on total weight of comonomers of an ester derived from the reaction of a polyhydric alcohol and an acid selected from the group consisting of acrylic acid and methacrylic acid, there being at least two hydroxyl groups of the alcohol esterified with the acid, in the presence of a free radical polymerization catalyst and a chain transfer agent.

Unpigmented coatings prepared from latices manufactured in accordance with this invention provide crystal clear dried films. If desired, the latices can be compounded with pigments, fillers and other known and conventional coatings additives. Since it is unnecessary to pre-emulsify the comonomer charge, the operational requirements for the process herein are more readily met than those of the relatively exotic pre-emulsion polymerization techniques heretofore known.

DESCRIPTION OF THE PREFERRED EMBODIMENTS

The vinyl ester comonomer (i) herein can be any of numerous vinyl esters well known in the art, as for example vinyl acetate, vinyl propionate, vinyl butyrate, and so forth.

Comonomer (i) is employed at a level of from about 40% to about 90%, and preferably, from about 45% to about 70%, by weight of the total comonomer charge. Vinyl acetate is especially preferred.

The alkyl acrylate or methacrylate comonomer (ii) is derived from the reaction of a monohydric alcohol, preferably of from 1 to about 18 carbon atoms, and more preferably, from 1 to 4 carbon atoms, with acrylic or methacrylic acid as the case may be. Among the alkyl acrylates and methacrylates which are useful herein are included methyl acrylate, ethyl acrylate, propyl acrylate, n-butyl acrylate, isobutyl acrylate, amyl acrylate, 2-ethylhexyl acrylate, methyl methacrylate, ethyl methacrylate, propyl methacrylate, n-butyl methacrylate, isobutyl methacrylate, etc.

Comonomer (ii) is employed at a level of from about 5% to about 35%, and preferably, from about 10% to about 30% by weight of the total comonomer charge. Butyl acrylate is preferred in the preparation of the copolymers of this invention.

The introduction of the multifunctional acrylate ester of comonomer (iii) enhances the physical properties of the resultant coating compositions. Representative multifunctional acrylates esters include ethylene glycol, diacrylate, butylene glycol diacrylate, glycerol diacrylate, glycerol triacrylate, ethylene dimethylacrylate, 1,3-propanediol dimethacrylate, 1,2,4-butanetriol trimethacrylate, 1,4-cyclohexanediol diacrylate, 1,4-benzenediol dimethacrylate, pentaerythritol tri- and tetraacrylate and methacrylate, dipentaerythritol hexacrylate, tripentaerythritol hexacrylate, tripentaerythritol octaacrylate, trimethylolprane triacrylate, trimethylolethane triacrylate, sorbitol hexacrylate, 1,3-propanediol diacrylate, 1,3-butylene glycol diacrylate, 1,5-pentanediol dimethacrylate, hexanediol diacrylate, the bisacrylates and methacrylates of polyethylene glycols of a molecular weight of 200–1500, and the like, including mixtures in all proportions.

Comonomer (iii) can be employed at as low as 0.5% by weight of the total comonomer charge but should not exceed about 10.0% the weight of the charge for otherwise, excessively hard, brittle coatings may result. The use of comonomer (iii) at a level of from about 1% to about 8% by weight of the total comonomer charge provides coatings having excellent flexibility and adhesion properties. Trimethylol-propane triacrylate and pentaerythritol triacrylate are especially useful multifunctional acrylates.

If desired, small quantities of comonomers containing carboxylic acid or hydroxyl groups can be added to the comonomer charge in order to provide cross linkable sites in the resulting copolymer. For example, copolymerizing acrylic acid and/or methacrylic acid with the vinyl ester, acrylate and/or methacrylate ester and multifunctional acrylate ester will provide pendant carboxylic groups in the copolymer backbone. Similarly the addition of a copolymerizable alcohol such as 2-hydroxyethyl acrylate, 2-hydroxypropyl acrylate, 2-hydroxyethyl methadrylate, and the like, will provide pendant hydroxyl groups.

If such comonomers are employed, they may be incorporated into the comonomer charge at up to about 10%, and preferably, up to about 5%, by weight of such charge. The carboxylic acid group-containing copolymer latices can also be formulated into colloidal dispersions (hydrosols) through neutralization of the acid groups with the inorganic or organic salt-forming base. For example, as an inorganic base, ammonium hydroxide can be advantageously employed. Primary, secondary or tertiary amines which can also contain other functional groups such as hydroxyl groups can advantageously be used herein. Examples of amines which can be reacted with the pendant carboxylic groups of the copolymers herein to provide carboxylate salts groups include methylamine, dimethylamine, triethylamine, ethylamine, diethylamine, triethylamine, tri-n-propylamine, cyclohexylamine, aniline, diethanolamine, triethonolamine, N,N-dimethylaminoethanol, pyridine, etc. The aliphatic tertiary amines are preferred for use herein, and of these, N,N-dimethylaminoethanol is especially preferred. The salt-forming base is added to the copolymer latex until a pH of from 7.0 to about 10.0, and preferably, from about 7.1 to 8.0, has been reached. Crosslinking of the polymers can be readily accomplished by the addition of an aminoplast curing agent, with or without an accompanying application of heat. Virtually any of the known and conventional aminoplasts can be used for this purpose, including, for example, the N-hydroxymethyl compounds described in U.S. Pat. No. 3,772,292 to Martin et al. which is incorporated by reference herein, ureaformaldehyde and melamine-formaldehyde condensation products and the Cymel (American Cyanamid Co.) series of alkoxy melamine crosslinking agents, the last mentioned being preferred. From about 1% to about 25% aminoplast by weight of acrylic copolymer latex, and preferably from about 5% to about 10% by weight of this ingredient can be used. The aminoplast cross linking agent is added to the multifunctional acrylate modified acrylic latex generally as an aqueous dispersion together with pigments, colorants, etc., if employed.

The procedures used to prepare the polymer latices of this invention generally involve admixing under rapid stirring the comonomer charge with water, surfactants or emulsifying agent, the polymerization catalyst or initiator, the chain transfer agent and, in most cases, a protective colloid-forming substance. The mixture is then heated to polymerization temperature for the time required to substantially complete the emulsion polymer formation. Many variations of the general preparative procedure are used to obtain, for example, lower viscosity, high solids content, improved freeze-thaw stability, etc. These variations include, for example, intermediate addition of surfactant to the polymerization reaction mixture during the polymerization (see U.S. Pat. No. 3,423,352); and addition of a water-soluble free radical initiator to a substantially completely polymerized emulsion and reacting further to reduce the viscosity of the emulsion (see U.S. Pat. No. 3,423,353).

The surfactants, or emulsifying agents employed can be any of the anionic, cationic, or non-ionic materials, commonly employed, as well as mixtures thereof, provided that preferably, a predominant amount of surfactant, i.e. at least 50% based on total weight of surfactant used, and usually all of the surfactant, contains at least four ether linkages. The surfactants are normally employed at levels of from about 1% to about 10% of the weight of total monomers present.

A particularly preferred class of polyether surfactants or emulsifying agents encompasses ethylene oxide and propylene oxide condensates in general, e.g., straight and branched-chain alkyl and alkylaryl polyethylene glycol and polypropylene glycol ethers and thioethers and more particularly substances such as the "Igepals", which are members of a homologous series of alkyphenoxpoly (ethyleneoxy) ethanols, which series can be represented by the general formula

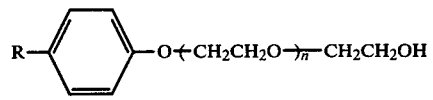

wherein R represents an alkyl radical and n represents the number of mols of ethylene oxide employed, included among which are alkylphenoxypoly (ethyleneoxy) ethanols having alkyl groups containing from about 7 to about 18 carbon atoms, inclusive, and having from about 4 to about 100 ethyleneoxy units, such as the heptylphenoxypoly (ethyleneoxy) ethanols, nonylphenoxypoly (ethyleneoxy) ethanols and dodecylphenoxypoly (ethyleneoxy) ethanols; the sodium, potassium or ammonium salts of the sulfate esters of these alkylphenoxypoly (ethyleneoxy) ethanols; alkylpoly (ethyleneoxy) ethanols; alkylpoly (propyleneoxy) ethanols; octylphenoxyethoxy ethyldimethylbenzylammonium chloride; polyethylene glycol t-dodecylthioether; the "Tweens," which are polyoxyalkylene derivatives of hexitol (including sorbitans, sorbides, mannitans and mannides) anhydride partial longchain fatty acid esters, such as the polyoxyalkylene derivatives of sorbitan monolaurate, sorbitan tristearate, sorbitan monooleate and sorbitan trioleate, the "Pluronics," which are condensates of ethylene oxide with a hydrophobic base, formed by condensing propylene oxide with propylene glycol, and the like.

As previously indicated, a protective colloid-forming substance is generally employed, and will usually contain at least one ether linkage, and preferably a plurality thereof. Included among such ether linkage-containing materials are hydroxymethyl cellulose, hydroxyethyl cellulose, ethyl hydroxyethyl cellulose, ethoxylated starch derivatives, and the like. However, other protective colloid-forming substances, i.e., ones containing no ether linkages, can also be used either alone or together with said ether linkage-containing materials, and included among these are partially and fully hydrolyzed polyvinyl alcohols, natural and synthetic gums, such as gum tragacanth and gum arabic, polyacrylic acid, poly (methyl vinyl ether/maleic anhydride), and the like. All of these materials will be used in the amounts found in conventional emulsion polymerization procedures (generally from about 0.1% to about 2% by weight, based on the total weight of the emulsion).

The emulsified monomer mixture is polymerized in the usual manner, i.e., by means of a catalytic amount of a conventional free radical polymerization catalyst or catalyst system (which can also be referred to as an addition polymerization catalyst, an acrylate polymerization catalyst or a polymerization initiator), with the proviso that the catalyst or catalyst system be substantially water soluble.

In a preferred embodiment, the acrylate polymerization reaction is carried out using a redox type catalytic system. In such a method, either avoiding presence of oxygen or removal of oxygen by some means is preferred in order to permit the catalyst to form free radicals. In a redox system, the catalyst is activated by means of a reducing agent, which in the absence of oxygen immediately produces free radicals without the use of heat, or with very mild heating. One of the reducing agents most commonly used is sodium metabisulfite alone or in combination with potassium persulfate. Other suitable agents include water soluble thiosulfates, bisulfites, hydrosulfites, and reducing salts, such as the sulfates of metal which are capable of existing in more than one valence state. This metal may include cobalt, iron, nickel, copper, etc.

The particular catalyst or catalyst system employed initially can generally be used in amounts ranging from about 0.01% to about 3% by weight, based on the total weight of comonomers present.

The chain transfer agent herein can be any of numerous known and conventional, normally liquid mercaptans commonly used in polymerization processes. n-Dodecyl mercaptan and isooctylthioglycolate are especially advantageous for use herein. From about 0.1% to about 1.0%, and preferably about 0.5%, of chain transfer agent by weight of comonomers is sufficient.

The resulting latices contain copolymers of from about 0.0003 to about 3 microns average particle size and a molecular weight in the range between about 20,000 to about 200,000 viscosity average.

The following examples are illustrative of the invention:

EXAMPLE I

A reaction vessel equipped with an oil bath heater, stirrer and two graduated dropping funnels, one containing the non-pre-emulsified mixture of acrylate comonomers, including multifunctional acrylate, and the other containing the aqueous catalyst solution. The comonomer and catalyst formulation was as follows:

| Ingredient | Amount(g) |
| --- | --- |
| n-Dodecyl Mercaptan | 2.0 |
| Vinyl Acetate | 422.3 |
| Butyl Acrylate | 74.5 |
| Trimethylolpropane Triacrylate | 43.2 |
| Natrosol 180 LR (Hydroxyethylcellulose) | 4.0 |
| Igepal Co977 | 28.2 |
| Igepal Co730 | 7.3 |
| B19 | 4.2 |
| Sodium Persulfate | 1.0 |
| Total Water | 413.3 |
| Total | 1000.0 |

The periods and amounts of comonomer and catalyst addition and the temperatures of the oil bath and the reaction vessel were recorded as follows:

| | Temperature ° C. | | Ingredients (g) | | |
| --- | --- | --- | --- | --- | --- |
| Time (Minutes) | Oil Bath | Reaction Vessel | Comonomer | Catalyst | Remarks |
| 0 | 74 | 72 | 57.0 | 5.0 | Polymerization started |
| 15 | 72 | 73 | 54.0 | 4.7 | |
| 30 | 72 | 73 | 50.5 | 4.4 | No reflux |
| 45 | 72 | 74 | 47.5 | 4.1 | |
| 60 | 72 | 74 | 44.0 | 3.8 | |
| 75 | 72 | 74 | 41.0 | 3.5 | |
| 90 | 72 | 74.5 | 37.5 | 3.2 | |
| 105 | 72 | 75 | 34.0 | 2.9 | |
| 120 | 72 | 75 | 31.0 | 2.6 | |
| 135 | 72 | 76 | 27.5 | 2.3 | |
| 150 | 72 | 77 | 24.0 | 2.0 | |
| 165 | 72 | 77 | 20.5 | 1.7 | |
| 180 | 72 | 76 | 17.0 | 1.4 | |
| 195 | 72 | 76 | 13.5 | 1.1 | Heated to 90° C. during |
| 210 | | | 10.5 | .8 | which remainder of |
| 225 | | | 7.0 | .5 | catalyst was added |
| 240 | | | 3.5 | .2 | |
| 255 | | | 0 | 0 | |
| Properties | | | | | |
| % Solids | 56.4 | | | | |
| Theoretical | 57.3 (98.4%) | | | | |
| Film | Clear | | | | |

Immediate initiation of the polymerization was evidenced by the development of a characteristic blue color. Only a slight reflux was evident and then only for about 15 minutes. The polymerization temperature remained exothermic throughout, even with only 50% of the catalyst solution being used (the entire solution was, however, introduced into the reaction medium toward the completion of polymerization). Because of the excellent rate of reaction, the time required for comonomer additions was reduced by about 25% compared to that required for a conventional pre-emulsion polymerization process.

EXAMPLE II

A polymerization procedure similar to that of Example 1 was employed with the following comonomer and catalyst formulation:

| Ingredient | Amount (g) |
|---|---|
| Isooctyl Thioglycolate | 1.0 |
| Vinyl Acetate | 391.7 |
| Butyl Acrylate | 97.9 |
| Trimethylolpropane Triacrylate | 20.4 |
| Igepal Co897 | 38.6 |
| Igepal Co530 | 6.7 |
| Natrosol 250 LR | 5.0 |
| Sodium Persulfate | 0.7 |
| Total Water | 438.0 |
| Total | 1000.0 |

The periods and amounts of comonomer and catalyst addition and the temperature of the oil bath and the reaction vessel were recorded as follows:

| Time (Minutes) | Temp. °C. Oil Bath | Temp. °C. Reaction Vessel | Ingredients (g) Comonomer | Ingredients (g) Catalyst | Remarks |
|---|---|---|---|---|---|
| 0 | 72 | 72 | 54.0 | 5.0 | |
| 15 | 73 | 72 | 50.7 | 4.7 | |
| 30 | 73 | 73 | 47.3 | 4.4 | |
| 45 | 73 | 73 | 44.0 | 4.1 | |
| 60 | 73 | 73 | 40.6 | 3.8 | |
| 75 | 73 | 73 | 37.3 | 3.5 | |
| 90 | 73 | 73.5 | 33.9 | 3.2 | |
| 105 | 73 | 74 | 30.6 | 2.9 | |
| 120 | 73 | 74 | 27.2 | 2.6 | |
| 135 | 73 | 74 | 23.9 | 2.3 | |
| 150 | 73 | 73 | 20.5 | 2.0 | |
| 165 | 73 | 73 | 17.2 | 1.7 | |
| 100 | 73 | 73 | 13.9 | 1.4 | |
| 195 | 73 | 73 | 10.5 | 1.1 | |
| 210 | 73 | 73.5 | 7.1 | .8 | |
| 225 | 73 | 74 | 3.8 | .5 | |
| 240 | 73 | 74 | 0 | .2 | |

What is claimed is:

1. A process for preparing multifunctional acrylate modified-vinyl ester-alkyl acrylate/methacrylate copolymer latex, highly stable and substantially coagulum-free, which comprises emulsion-polymerizing a non-pre-emulisified mixture of:
   (i) from about 40% to about 95%, based on the total weight of comonomers, of a vinyl ester selected from the group consisting of vinyl acetate, vinyl propionate and vinyl butyrate
   (ii) from about 5% to about 35%, based on the total weight of comonomers, of an ester derived from the reaction of a monohydric alcohol and acrylic acid or methacrylic acid, and
   (iii) from about 0.5% to about 10%, based on the total weight of comonomers, of an ester derived from the reaction of a polyhydric alcohol and an acid selected from the group consisting of acrylic acid and methacrylic acid, there being at least two hydroxyl groups of the alcohol esterified with the acid, in the presence of water, a free radical polymerization catalyst and a normally liquid mercaptan chain transfer agent.

2. The process of claim 1 wherein the vinyl ester (i) is vinyl acetate.
3. The process of claim 1 wherein the vinyl ester (i) is employed at from 45% to about 70% based on the total weight of comonomers.
4. The process of claim 1 wherein the ester (ii) is butyl acrylate.
5. The process of claim 1 wherein ester (ii) is employed at from about 10% to about 30% based on the total weight of comonomers.
6. The process of claim 1 wherein ester (iii) is trimethylolpropane triacrylate or pentaerythritol triacrylate.
7. The process of claim 1 wherein ester (iii) is employed at from about 0.5% to about 10.0% based on total weight of comonomers.
8. The process of claim 1 wherein the total comonomer contains up to 10% by weight of a copolymerizable composition which will contribute pendant carboxylic acid groups in the backbone of the resulting copolymer.
9. The process of claim 8 wherein the copolymerizable composition is acrylic acid or methacrylic acid.
10. The process of claim 1 wherein the total comonomer contains up to 10% by weight of a copolymerizable composition which will contribute pendant hydroxyl groups in the backbone of the resulting copolymer.
11. The process of claim 10 wherein the copolymerizable composition is 2-hydroxyethyl methacrylate.
12. The process of claim 1 wherein the catalyst is a redox catalyst.
13. The process of claim 1 wherein the mercaptan is n-dodecyl mercaptan.
14. The process of claim 1 wherein the mercaptan is isooctythioglycolate.
15. The process of claim 1 wherein the chain transfer agent is employed at a level of from about 0.1% to about 1.0% based on total weight of comonomers.
16. A process for preparing multifunctional acrylate modified-vinyl ester-alkyl acrylate/methacrylate copolymer latex, highly stable and substantially coagulum free, which comprises emulsion-polymerizing a non-pre-emulsified mixture of:
   (i) from about 40 to about 95% based on total weight comonomers, of vinyl acetate
   (ii) from about 5% to about 35%, based on total weight of comonomers, of butyl acrylate
   (iii) from about 0.5% to about 10%, based on total weight of comonomers, of trimethylolpropane triacrylate or pentaerythritol triacrylate, in the presence of water, a redox catalyst and about 0.1% to about 1.0%, by weight based on total weight of comonomers of a normally liquid mercaptan chain transfer agent.

* * * * *